(12) United States Patent
Tsuruśaki et al.

(10) Patent No.: US 6,768,854 B2
(45) Date of Patent: Jul. 27, 2004

(54) COATED OPTICAL FIBER AND MANUFACTURING METHOD AND APPARATUS THEREFOR

(75) Inventors: Koji Tsuruśaki, Sakura (JP); Koichi Harada, Sakura (JP); Munehisa Fujimaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 48 days.

(21) Appl. No.: 10/281,009

(22) Filed: Oct. 25, 2002

(65) Prior Publication Data
US 2003/0138230 A1 Jul. 24, 2003

(30) Foreign Application Priority Data
Nov. 6, 2001 (JP) ........................................ 2001-341213
Mar. 22, 2002 (JP) ........................................ 2002-081929

(51) Int. Cl.[7] .............................................. G02B 6/22
(52) U.S. Cl. ...................... 385/128; 385/147; 242/920; 65/539
(58) Field of Search ................................ 385/128, 123, 385/147; 65/382, 443, 447, 450, 453, 491, 529, 539; 427/163.2; 242/920

(56) References Cited
U.S. PATENT DOCUMENTS 4,000,936 A * 1/1977 Gloge .......................... 385/102
4,147,407 A * 4/1979 Eichenbaum et al. ......... 385/141

FOREIGN PATENT DOCUMENTS

| EP | 0 887 298 A1 | 12/1998 |
| EP | 1 174 396 A1 | 1/2002 |
| JP | 2863071 | 4/1995 |
| JP | 07109150 | 4/1995 |
| WO | WO00/44680 | 8/2000 |

* cited by examiner

Primary Examiner—John D. Lee
Assistant Examiner—Mike Stahl
(74) Attorney, Agent, or Firm—Hoffmann & Baron, LLP

(57) ABSTRACT

A manufacturing method and apparatus for manufacturing a coated optical fiber which has a superior surface smoothness of a resin coating and which can be coated with a colored ink with high coating performance. In the method including the steps of making a coated optical fiber by forming an outer coating layer around a bare optical fiber; and winding the coated optical fiber via pulleys by a take-up, the surface roughness of each solid body which the outer layer of the running coated optical fiber contacts is 0.8 μm or less. When the temperature of the outer coating layer is a room temperature or the Young's modulus of the outer coating layer is higher than 500 MPa, the surface roughness of each solid body, which the outer layer of the coated optical fiber contacts during drawing or rewinding, is 1.2 μm or less.

15 Claims, 6 Drawing Sheets

COATED OPTICAL FIBER AND MANUFACTURING METHOD AND APPARATUS THEREFOR

"This application claims priority to Japanese Patent Application No. 2001-341213 filed on Nov. 6, 2001 and Japanese Patent Application No. 2002-081929 filed on Mar. 22, 2002."

BACKGROUND OF THE INVENTION

1. Field of the Invention

The present invention relates to a manufacturing method for and to an apparatus for manufacturing high-quality coated optical fibers at high speed, and to coated optical fibers whose coating layers have superior surface smoothness.

2. Description of Related Art

Conventionally, coated optical fibers are manufactured by employing the following method. In the first process, an optical fiber preform (i.e., base material) is melted at approximately 2,000° C. so as to form a bare optical fiber by drawing. The bare optical fiber is then made to pass through a cooling system so that the temperature of the bare optical fiber is decreased to approximately 100° C. or lower. The bare optical fiber is then coated with a UV curable resin or a thermosetting resin by using a resin coating system, and the resin is cured by using a resin curing system, thereby yielding a coated optical fiber. This coated optical fiber is wound up by a take-up via pulleys.

Recently, productivity has been improved by employing high-speed drawing. However, at high drawing speed of 400 m/min or higher, the amount of movement of the optical fiber in the lateral direction (i.e., perpendicular to the fiber-running direction) increases. In this case, (i) the optical fiber may contact the nipple of the resin coating system, which degrades the strength of the optical fiber, or (ii) the thickness of the coating layer is not uniform, which degrades the characteristics with respect to the lateral (or side) pressure. Here, increase of the flow rates of (i) the gas for cooling the bare or coated optical fiber and (ii) the purge gas in the resin curing system is a cause of such increase of movement of the optical fiber, because the optical fiber vibrates due to the flow of the above gases. There may be various other causes, but the inventors of the present invention found that the smoothness of the surface of the pulley, which the coated optical fiber first contacts, is also related to such movement of the optical fiber in the lateral direction.

In order to solve the above problem, Japanese Patent No. 2863071 discloses a process of manufacturing a coated optical fiber by forming a coated layer around a bare optical fiber and winding this fiber using solid bodies such as pulleys by a winding system, where the surface roughness of the solid body which the coated optical fiber first contacts is 0.6 µm or less. The objective of this invention is to reduce (i) the movement of the optical fiber in the lateral direction and (ii) unevenness of the thickness of the coating layer, and the usage of a solid body having a smooth surface suppresses the lateral movement or vibration of the optical fiber due to the unevenness of the surface of the solid body.

However, though the above conventional invention has the objective of reducing the lateral movement of the optical fiber and the unevenness of the thickness of the coating layer, the conventional invention has no objective of improving the smoothness of the surface of the coated optical fiber. In addition, Japanese Patent No. 2863071 discloses only the surface roughness of the solid body which the coated optical fiber first contacts and does not disclose the surface roughness of each of the following solid bodies which, the optical fiber contacts in turn and of the solid bodies used in the processes other than the drawing process, for example, solid bodies which the optical fiber contacts in a rewinding process.

In addition, the surface temperature and the Young's modulus of the optical fiber are not investigated in the above patent.

In the drawing process of the coated optical fiber, the temperature of the coating layer of the coated optical fiber after passing through the UV lamp (i.e., UV radiation device) is higher than room temperature, and such a high-temperature coated optical fiber contacts solid bodies such as a capstan (to which the fiber is applied) and a dancer (including a dancer pulley) before being wound up by the take-up (i.e., winding system or machine).

Generally, the capstan, the dancer, a path line pulley, and the take-up are made of metal. For example, iron (Fe) has a Young's modulus of 60,000 MPa (megapascal) though this value varies due to the quality of the material. Stainless steel and aluminium have Young's moduli of a similar order. Other materials such as ceramics may also be used; however, these materials are all hard material and have a Young's modulus of a few ten thousand MPa.

On the other hand, the surface of the outer coating layer of the coated optical fiber has a Young's modulus of approximately a few hundred MPa, and as explained above, the Young's modulus of each solid body, which the optical fiber contacts, is a few ten thousand MPa. It is obvious that when a hard body is pushed against a softer material (i.e., the coating layer of the coated optical fiber), the softer coating layer will deform. In particular, if the temperature of the outer coating layer of the coated optical fiber is high, such contact with a solid body causes considerable effects on the coating layer.

Therefore, when the surface smoothness of the solid bodies, which the coated optical fiber contacts, is inferior, the surface of the coated optical fiber is made slightly uneven. Such an uneven surface may be easily observed as being an inferior product, thereby considerably degrading its commercial value.

In addition the coated optical fiber is generally coated with a colored ink so as to distinguish each fiber from the others when coated optical fibers are coated so as to produce an optical cable, cord, ribbon, or tape. If the surface of the optical fiber is slightly uneven, the performance of the colored ink coating may be degraded.

SUMMARY OF THE INVENTION

In consideration of the above circumstances, an object of the present invention is to investigate the relationships between the temperature and the Young's modulus of the outer coating layer of the optical fiber and the surface roughness of the solid bodies which contact the optical fiber during the drawing process, and to provide a manufacturing method and apparatus for manufacturing a coated optical fiber which has a superior surface smoothness of a resin coating and which can be coated with a colored ink with high coating performance, thereby preventing inferiority of the appearance and coloring on the coated optical fiber which is caused by inferior smoothness of the surface of the resin coating layer.

Therefore, the present invention provides a method of manufacturing a coated optical fiber, comprising the steps of:

making a coated optical fiber by forming an outer coating layer around a bare optical fiber; and winding the coated optical fiber via pulleys by a take-up, wherein the surface roughness of each solid body which the outer layer of the running coated optical fiber contacts is 0.8 µm or less.

According to the above method, the smoothness of the outer coating layer of the coated optical fiber can be improved. Therefore, it is possible to manufacture a coated optical fiber having superior surface smoothness and superior coloring performance using a colored ink.

As a typical example, when the temperature of the outer coating layer is 35° C. or higher, the surface roughness of each solid body which the outer layer of the coated optical fiber contacts is 0.8 µm or less.

As another typical example, when the Young's modulus of the outer coating layer is 500 MPa or lower, the surface roughness of each solid body which the outer layer of the coated optical fiber contacts is 0.8 µm or less.

The present invention also provides a method of manufacturing a coated optical fiber, comprising the steps of:

making a coated optical fiber by forming an outer coating layer around a bare optical fiber; and winding the coated optical fiber via pulleys by a take-up, wherein when at least one of the conditions that the temperature of the outer coating layer is a room temperature and the Young's modulus of the outer coating layer is higher than 500 MPa is satisfied, the surface roughness of each solid body, which the outer layer of the coated optical fiber contacts during drawing or rewinding, is 1.2 µm or less.

Accordingly, the smoothness and the coloring performance (using a colored ink) of the outer coating layer of the coated optical fiber can be improved while the manufacturing cost is reduced.

The present invention also provides a coated optical fiber manufactured by a method as explained above, wherein the coated optical fiber has an average surface roughness of 0.2 µm or less (0.15 µm or less is more preferable) so as to reduce the defect percentage of coloring of the fiber.

The present invention also provides an apparatus for manufacturing a coated optical fiber, comprising:

a drawing furnace for melting an optical fiber preform and forming a bare optical fiber;

a cooling system for cooling the formed bare optical fiber;

a resin coating system for coating the bare optical fiber with resin which functions as an outer coating layer of the coated optical fiber;

a curing system for curing the resin; and pulleys arranged in a path line along which the coated optical fiber is transferred to a take-up, wherein the surface roughness of each solid body which the outer layer of the running coated optical fiber contacts is 0.8 µm or less.

According to the above apparatus, the smoothness of the outer coating layer of the coated optical fiber can be improved. Therefore, it is possible to manufacture a coated optical fiber having superior surface smoothness and superior coloring performance using a colored ink.

The present invention also provides an apparatus for manufacturing a coated optical fiber, comprising:

a drawing furnace for melting an optical fiber preform and forming a bare optical fiber;

a cooling system for cooling the formed bare optical fiber;

a resin coating system for coating the bare optical fiber with resin which functions as an outer coating layer of the coated optical fiber;

a curing system for curing the resin; and pulleys arranged in a path line along which the coated optical fiber is transferred to a take-up, wherein when at least one of the conditions that the temperature of the outer coating layer is a room temperature and the Young's modulus of the outer coating layer is higher than 500 MPa is satisfied, the surface roughness of each solid body (i.e., a constituent of the path line) which the outer layer of the coated optical fiber contacts is 1.2 µm or less.

Accordingly, the smoothness and the coloring performance (using a colored ink) of the outer coating layer of the coated optical fiber can be improved while the manufacturing cost is reduced.

The present invention also provides a coated optical fiber manufactured by an apparatus as explained above, wherein the coated optical fiber has an average surface roughness of 0.2 µm or less (0.15 µm or less is more preferable) so as to reduce the defect percentage of coloring of the fiber.

DESCRIPTION OF THE PREFERRED EMBODIMENTS

Hereinafter, embodiments according to the present invention will be explained with reference to the drawings.

Figure 1:
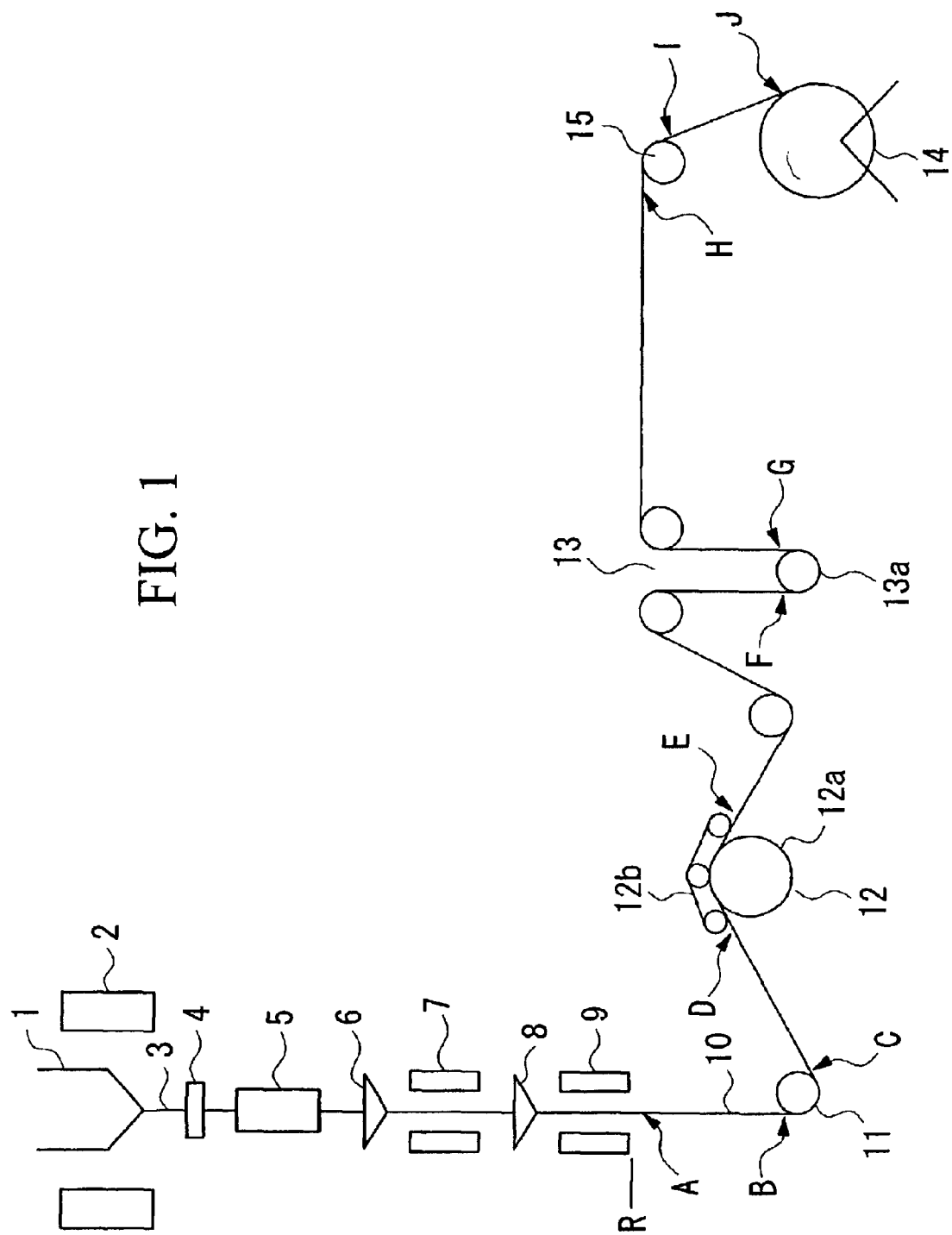
FIG. 1 is a diagram showing the structure of the apparatus for manufacturing the coated optical fiber, as an embodiment of the present invention.

An embodiment of the apparatus for manufacturing the coated optical fiber will be shown in FIG. 1.

In FIG. 1, reference numeral 1 indicates an optical fiber preform, and this preform 1 is melted in a drawing furnace 2 so as to form a bare optical fiber 3. The outer diameter of this bare optical fiber 3 is measured by an outer-diameter measuring device 4. The bare optical fiber 3 is then supplied to a cooling system 5 for cooling the fiber, and the fiber is then supplied to a first resin coating system 6.

In the first resin coating system 6, the bare optical fiber 3 is coated with a resin so as to form a coating layer around the bare optical fiber. The optical fiber is then supplied to a first curing system 7 in which the resin is cured so that a primary coating layer is formed. The primary coating of the optical fiber is further coated with a resin by a second resin coating system 8, and this resin is cured by a second curing system 9 so that a secondary coating layer (corresponding to the outer coating layer of the present invention) is formed. According to the above process, a coated optical fiber 10 is manufactured.

The manufacturing apparatus of the coated optical fiber 10 is basically arranged in the longitudinal direction; however, the direction of the coated optical fiber 10 is changed at a turn pulley 11 by 90 degrees, and the optical fiber is wound up by a take-up 14 via a capstan 12 and a dancer 13.

The capstan 12 generally operates at constant speed; however, a slight variation in the speed (of transferring the fiber) is present in correspondence with a slight variation of the outer diameter of the coated optical fiber 10. In accordance with this variation in speed, the retained length of the coated optical fiber 10 is controlled using the dancer 13, and the speed of winding the fiber by the take-up 14 also follows the variation.

Additionally, each of the capstan 12, the dancer 13, and the take-up 14 has a suitable entering position and angle of the optical fiber, and the path line pulley 15 is used for forming a preferable path line by which such suitable entering position and angle can be realized.

As the coating material for the coated optical fiber 10, UV curable resin (i.e., UV resin) is generally adopted, although thermosetting silicone resin may be used. Furthermore, generally, a bare optical fiber having an outer diameter of 125 $\mu$m is coated with two UV resin layers so as to form a coated optical fiber having an outer diameter of 240 to 250 $\mu$m. In this structure, the inner layer is a soft layer having a Young's modulus of approximately 0.3 to 1.2 MPa (megapascal), while the outer layer is a hard layer having a Young's modulus of approximately 600 to 950 MPa. The above values of the Young's modulus are all defined at a room temperature (23° C.).

As the UV resin, epoxy acrylate, butadiene acrylate, or ester acrylate resin may be used; however, urethane acrylate resin is most popularly used. The UV resin is cured in a UV radiation device (i.e., UV lamp) so that the fluid (or liquid) is changed to a solid.

In most cases, this hardening reaction is an exothermic reaction, and UV lamp emits not only UV light but also visible and infrared light. Therefore, the temperature of the UV resin is high during and immediately after the hardening process. The temperature depends on the kind and composition of the resin and on the amount of UV irradiation; however, in the general hardening process of fiber drawing, the temperature is approximately 120 to 200° C.

A suitable drawing speed is determined according to the size of the preform, the cooling capacity, the performance of the capstan, the performance of a controller, and the like. The output power and the number of lamps of the UV lamp are also suitably determined so as to have a desired hardness of the resin.

As shown in FIG. 1, the coated optical fiber 10 contacts the turn pulley 11, a capstan pulley 12a, a capstan belt lap 12b, a dancer pulley 13a, and the path line pulley 15, and these pulleys and the like are solid bodies. The resin temperature (i.e., the temperature of the resin portion) and the Young's modulus of the coated optical fiber 10 change depending on each contact position of the solid bodies.

The present invention optimizes the surface roughness of the solid bodies which the coated optical fiber 10 contacts, and realizes a manufacturing method and apparatus for manufacturing a coated optical fiber which has a superior surface smoothness of a resin coating and which can be coated with a colored ink with high coating performance. It is preferable that the surface roughness of the solid bodies which the coated optical fiber first contacts be 0.8 $\mu$m or less.

According to the investigation of the relationships between (i) the resin temperature and the Young's modulus of the outer resin coating of the coated optical fiber 10 and (ii) the surface roughness of the solid bodies, when the temperature of the outer coating layer of the coated optical fiber is 35° C. or higher or when the Young's modulus of the outer coating layer of the coated optical fiber is 500 Mpa or lower, it is preferable that the surface roughness of the solid bodies which the coated optical fiber first contacts be 0.8 $\mu$m or less.

In addition, the outer coating layer of the coated optical fiber 10 may contact the solid bodies while the coating layer is at a room temperature. In order to making the fiber run from the turn pulley to the take-up while having a room temperature or an temperature in the vicinity of ordinary temperature, for example, a sufficient distance is ensured between the UV lamp and the turn pulley, or a cooling pipe may be provided between the UV lamp and the turn pulley.

When the secondary resin coating layer of the coated optical fiber 10 has a room temperature or when the Young's modulus of the secondary resin coating layer is sufficiently higher than 500 MPa, it is preferable that the surface roughness of the solid bodies which the coated optical fiber 10 contacts be 1.2 $\mu$m or less.

The reason for applying the above range to the surface roughness will be explained below in the following examples.

The surface smoothness in the present embodiment is defined in JIS-B0601 (JIS: Japanese Industrial Standards) and is measured by an optical or contact surface-roughness measurement device. The measurement value of the unevenness of the surface of each pulley is referred to as an index which indicates the surface smoothness of the pulley.

The material of which the pulley is made is not limited, but it should have superior durability, mechanical strength, and the like, and metal ceramics, hard plastics, engineering plastics, and the like are preferable.

In order to apply superior smoothness to each pulley, it is preferable to subject the pulley to a hard-coating process, in which a thin film of metal or the like is formed after polishing the surface of the pulley. As the thin-film forming method, plating such as chrome plating, CVD (chemical vapor deposition), electroless plating, or the like for forming a thin metal film is preferable; however, no specific limitation is applied. As for the coating material, any material can be selected according to the size and material of the pulley. In addition, only polishing or thin-film forming may be employed so as to smooth the surface of the pulley.

Below, concrete examples will be shown.

EXAMPLE 1

A coated optical fiber was manufactured using a bare optical fiber which is a single-mode fiber having an outer diameter of 1.25 µm, a mode-field diameter of 9.2 µm, and a cut-off wavelength of 1.25 µm. As the coating material, urethane acrylate UV curable resin was used. The outer diameter of the primary coating layer was 190 µm, and the outer diameter of the secondary coating layer was 245 µm.

The drawing speed was 1500 m/min. The position of the UV lamp was "R" in FIG. 1. This position R indicates the reference position of the UV lamp, and when the lowest position of the second curing system 9. As a temperature measuring device for measuring the temperature of the coating layer, a high-speed temperature measuring system (product name "Non-tact II") for measuring linear devices, made by IRCON CO., LTD., was used.

All solid bodies which contact the optical fiber after passing the second curing system 9, that is, the turn pulley 11, the capstan 12, the dancer 13, the path line pulley 15, and the take-up 14, had a surface roughness of 0.1 µm or less, which is measured at the portion where each solid body contacts the coated optical fiber 10. The surfaces of these solid bodies were processed by hard chrome plating applied to the iron surface. In addition, the belt lap 12b of the capstan 12 was made of urethane rubber having a surface roughness of 0.3 µm.

EXAMPLE 2

The drawing speed was varied within the range from 200 to 2,000 m/min. The other conditions for manufacturing the coated optical fiber were the same as those of Example 1.

EXAMPLE 3

The secondary curing system 9 was moved from the reference position R in the longitudinal direction (along which the outer-diameter measuring device 4 to the UV lamp 9 are arranged). The other conditions for manufacturing the coated optical fiber were the same as those of Example 1.

Comparative Example 1

The surface of the capstan pulley 12a of the capstan 12 was subjected to sand blasting, in which hard sandy particles are blown onto the metal surface so as to make the surface uneven), and the surface was suitably polished to obtain a different specific surface roughness. The other conditions for manufacturing the coated optical fiber were the same as those of Example 1.

Comparative Example 2

The surface roughness of the belt lap 12b was changed while the material thereof was not changed. The other conditions for manufacturing the coated optical fiber were the same as those of Example 1.

Comparative Example 3

The surface roughness of a contact portion (which contacts the coated optical fiber) of the dancer pulley 13a of the dancer 13 was changed. The other conditions for manufacturing the coated optical fiber were the same as those of Examples 1, 2, and 3.

Comparative Example 4

The surface roughness of a contact portion (which contacts the coated optical fiber) of the path line pulley 15 was changed. The other conditions for manufacturing the coated optical fiber were the same as those of Examples 1, 2, and 3.

Comparative Example 5

The surface roughness of a contact portion (which contacts the coated optical fiber) of the path line pulley 15 was 2 µm, and the kind of material for the secondary coating layer was changed. The other conditions for manufacturing the coated optical fiber were the same as those of Example 1. More specifically, in addition to resin A which is the material for the secondary coating layer, different resins B, C, D, and E were each used for making the secondary coating layer.

Test 1: As for the coated optical fibers manufactured in Examples 1 to 3, the temperature of the secondary coating layer of each running fiber was measured.

Test 2: A 25 km-portion of the manufactured coated optical fibers was wound up around a bobbin, each bobbin (for each 25 km-portion) having the same shape, and the appearance of the fiber was visually observed and investigated. Here, 100 coated optical fibers were investigated for each condition (defined in each Example).

Test 3: A 1000 km-portion of each manufactured coated optical fiber was colored and frequency of coloring defective such as presence of uneven or uncolored portions was investigated. The ink used for coloring was KSU-455 (product number) manufactured by Kansai Paint Co. Ltd.

Test 4: Each coated optical fiber manufactured in Example 1 was subjected to a rewind test at a room temperature of 23° C. In this test, the surface roughness of a path line pulley 15 in the rewinding path line was changed. Under these conditions, the appearance of the rewound coated optical fiber was observed and investigated.

Below, results of the above tests will be explained.

First, results of Test 1 will be explained. The measured temperatures of the coated optical fibers manufactured in Examples 1 to 3 are shown in Table 1.

TABLE 1

| Condition Drawing Speed Position of No UV lamp | Unit | Example 1 | Example 2 | | | | Example 3 | | | | |
|---|---|---|---|---|---|---|---|---|---|---|---|
| | M/min m | 1500 REF | 200 REF | 500 REF | 1000 REF | 2000 REF | 1500 +1 | 1500 +3 | 1500 −1 | 1500 −3 | 1500 −5 |
| A Exit from UV lamp | ° C. | 135 | 125 | 129 | 132 | 143 | 136 | 135 | 135 | 136 | 135 |
| B Entry to | ° C. | 103 | 61 | 81 | 92 | 117 | 112 | 123 | 94 | 85 | 76 |

TABLE 1-continued

| Condition Drawing Speed Position of No UV lamp | Unit M/min m | Example 1 1500 REF | Example 2 | | | | Example 3 | | | | |
|---|---|---|---|---|---|---|---|---|---|---|---|
| | | | 200 REF | 500 REF | 1000 REF | 2000 REF | 1500 +1 | 1500 +3 | 1500 −1 | 1500 −3 | 1500 −5 |
| C Exit from Turn Pulley | °C. | 99 | 58 | 76 | 88 | 111 | 105 | 115 | 90 | 81 | 71 |
| D Entry to Capstan | °C. | 76 | 41 | 50 | 62 | 93 | 83 | 96 | 65 | 58 | 48 |
| E Exit from Capstan | °C. | 62 | 34 | 41 | 52 | 77 | 70 | 80 | 51 | 44 | 38 |
| F Entry to Dancer Pulley | °C. | 51 | 32 | 35 | 42 | 62 | 59 | 64 | 42 | 40 | 34 |
| G Exit from Dancer Pulley | °C. | 47 | 31 | 33 | 40 | 59 | 55 | 59 | 38 | 36 | 33 |
| H Entry to Path line Pulley | °C. | 41 | 30 | 32 | 37 | 48 | 42 | 48 | 35 | 33 | 30 |
| I Exit from Path line Pulley | °C. | 39 | 29 | 31 | 35 | 46 | 40 | 46 | 34 | 32 | 29 |
| J Entry to Take-up | °C. | 36 | 28 | 29 | 33 | 40 | 37 | 39 | 33 | 30 | 28 |

In Table 1, "No" indicates each measured position shown in FIG. 1 (see reference symbols A to J). "REF" means that the lowest position of the UV lamp for forming the secondary coating layer is at the above-explained reference position in the longitudinal direction, and the "+" direction means the shift of the lowest position of the UV lamp from the reference position to the lower side in FIG. 1 (i.e., to the side where the turn pulley 11 is present), while the "−" direction means the shift of the lowest position of the UV lamp from the reference position to the upper side in FIG. 1 (i.e., towards the side where the second resin coating system 8 is present). The unit of the shift is m (meter) and the number of lamps included in the UV lamp and the output power of the UV lamp were not changed.

Below, results of Tests 2 and 3 will be examined.

First, results of Tests 2 and 3 for the coated optical fibers manufactured by Examples 1, 2, and 3 and Comparative Examples 1, 2, 3, and 4 are shown in FIGS. 2 to 7.

Figure 2:
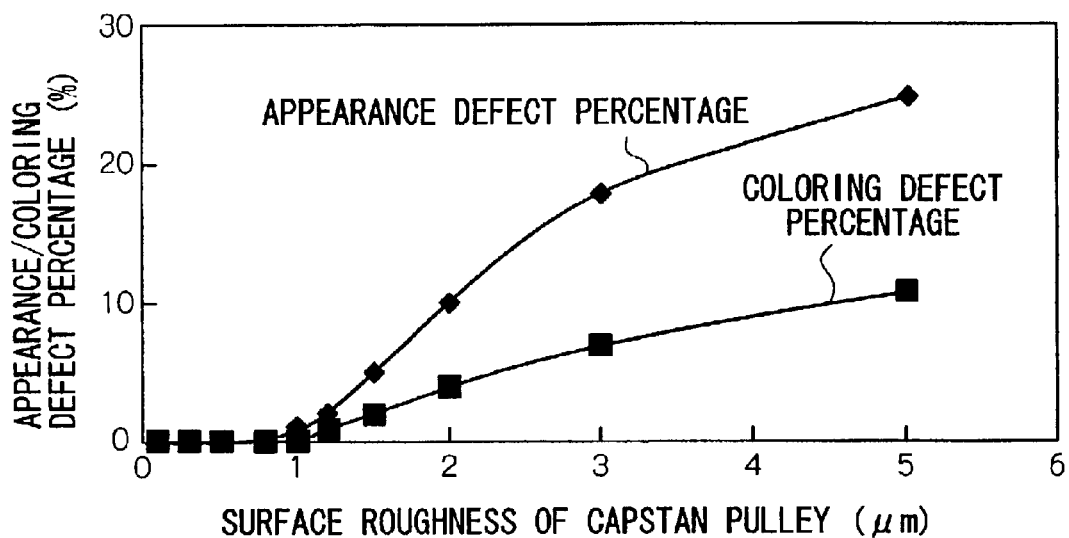
FIG. 2 is a graph showing the relationships between the surface roughness of the capstan pulley and the defect percentage relating to the appearance and coloring of the coated optical fiber.

FIG. 2 shows results with respect to Example 1 and Comparative Example 1. In the graph of FIG. 2, the horizontal axis shows the surface roughness ($\mu$m) of the capstan pulley 12a and the vertical axis shows the defect percentage relating to the appearance and coloring.

In Example 1, the surface roughness of the capstan pulley 12a is 0.1 $\mu$m or less (in the horizontal axis of FIG. 2, the point corresponding to 0.1 $\mu$m is marked), and the defect percentage values of the appearance and coloring are both zero. However, according to increase of the surface roughness of the capstan pulley 12a, more specifically, after the surface roughness exceeds approximately 0.8 $\mu$m, the defect percentage values of the appearance and the coloring both increase.

Figure 3:
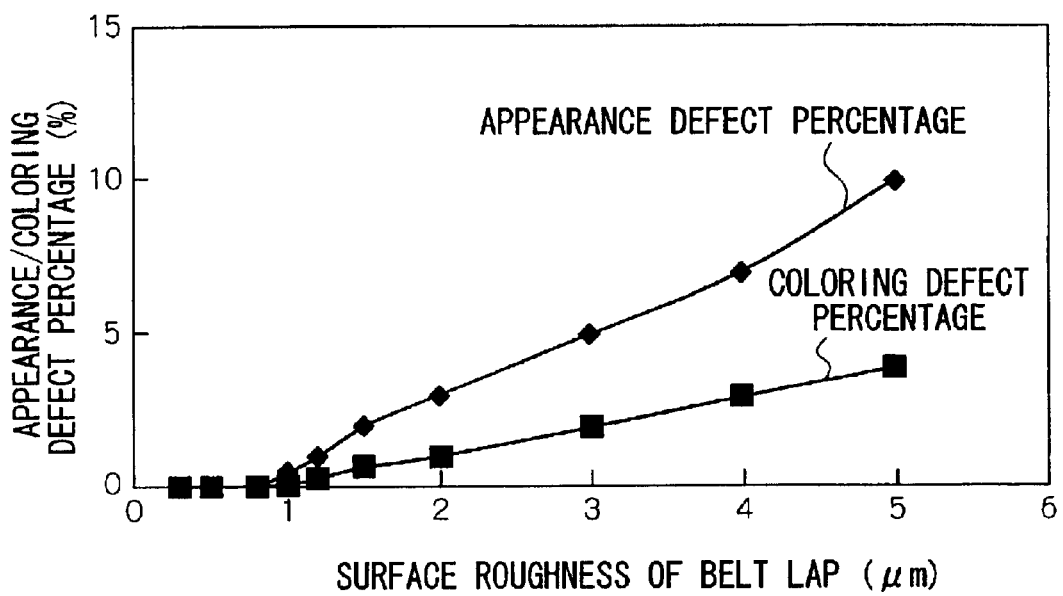
FIG. 3 is a graph showing the relationships between the surface roughness of the capstan belt lap and the defect percentage relating to the appearance and coloring of the coated optical fiber.

FIG. 3 shows results with respect to Example 1 and Comparative Example 2. In the graph of FIG. 3, the horizontal axis shows the surface roughness ($\mu$m) of the capstan belt lap 12b and the vertical axis shows the defect percentage relating to the appearance and coloring.

In Example 1, the surface roughness of the capstan belt lap 12b is 0.3 $\mu$m, and the defect percentage values of the appearance and coloring are both zero. However, according to increase of the surface roughness of the capstan belt lap 12b, more specifically, after the surface roughness exceeds approximately 0.8 $\mu$m, the defect percentage values of the appearance and coloring both increase.

The defect percentage values relating to the appearance and coloring both indicate defectives on the observed appearance of the coated optical fiber; thus, both values obviously have similar inclinations. Here, the surface roughness of the coated optical fiber for determining the defect appearance is 0.8 $\mu$m or larger, and the surface roughness of the coated optical fiber for determining the coloring defective is 1.0 $\mu$m or larger. However, the defect percentage values relating to the appearance are actually higher than those of the defect percentage values relating to the coloring; thus, the defect appearance can be used to perform detailed investigation of the coated optical fiber. Therefore, in the following explanations, the defect appearance is representatively referred to.

Figure 4:
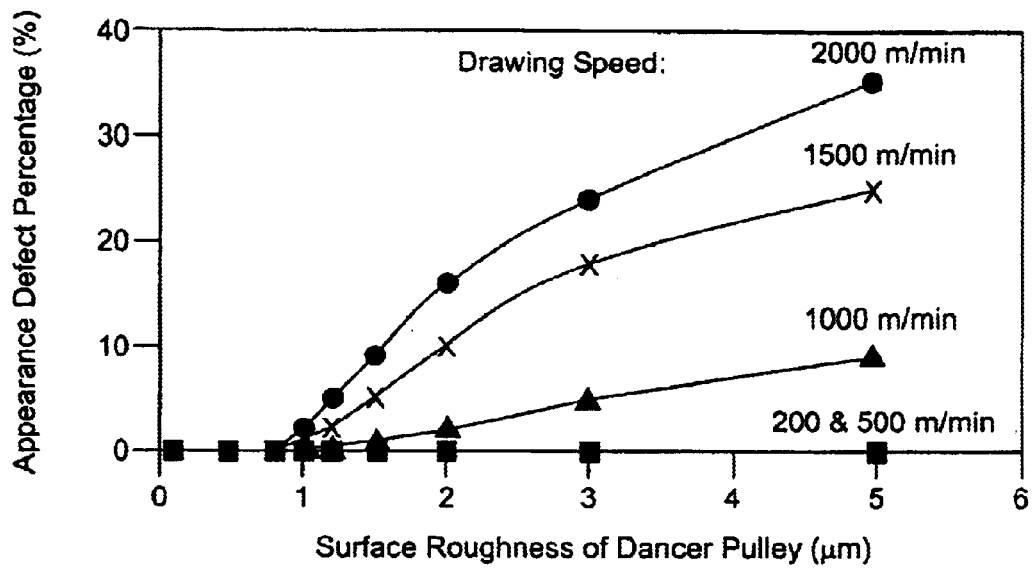
FIG. 4 is a graph showing the relationships between the surface roughness of the dancer pulley and the appearance defect percentage of the coated optical fiber, which were defined when the drawing speed was varied.

FIG. 4 shows results relating to Comparative Example 3.

In the graph of FIG. 4, the horizontal axis shows the surface roughness ($\mu$m) of the dancer pulley 13b and the vertical axis shows the defect percentage relating to the appearance. Each curve corresponds to a different drawing speed (m/min).

When the drawing speed is high such as 1000 m/min or higher, the defect percentage of the appearance increases after the surface roughness of the dancer pulley 13a exceeds approximately 0.8 $\mu$m (i.e., similar to the results shown in FIGS. 2 and 3).

However, when the drawing speed is low such as 200 or 500 m/min, no defect appearance occurs even the surface roughness of the dance pulley 13a is large. This result is distinctive in comparison with the case in which the surface roughness of the capstan pulley 12a or the capstan belt lap 12b is changed.

Figure 5:
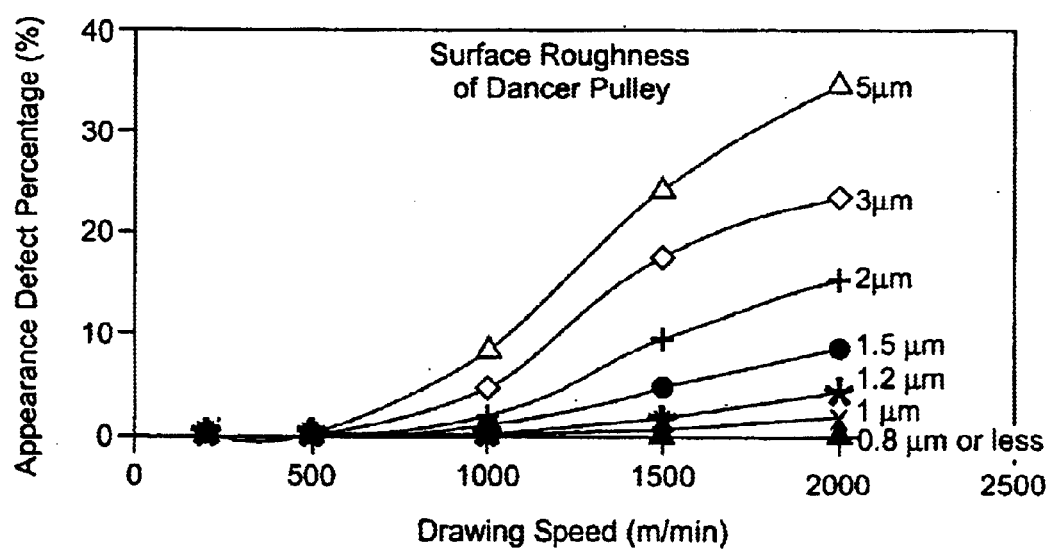
FIG. 5 is a graph showing the relationships between the drawing speed and the appearance defect percentage of the coated optical fiber, which were defined when the surface roughness of the dancer pulley was changed.

FIG. 5 is illustrated based on the same results as those in FIG. 4. In FIG. 5, the horizontal axis shows the drawing speed (m/min), the vertical axis shows the defect percentage relating to the appearance, and each curve corresponds to a different surface roughness (μm) of the dancer pulley 13b.

Similar to the results shown in FIGS. 2 and 3, when the surface roughness of the dancer pulley 13b is 0.8 μm or less, no defect appearance occurs for each drawing speed. However, as a distinctive result, the drawing speed for producing the defect appearance changes depending on the surface roughness of the dancer pulley 13a.

According to the results shown in List 1, it is obvious that changes in the drawing speed cause changes of the temperature of the secondary coating layer of the optical fiber which passes through the path line. Therefore, if correlation between the temperature of the secondary coating layer and the appearance defect percentage is determined, it is possible to establish a causal relationship between these parameters.

Figure 6:
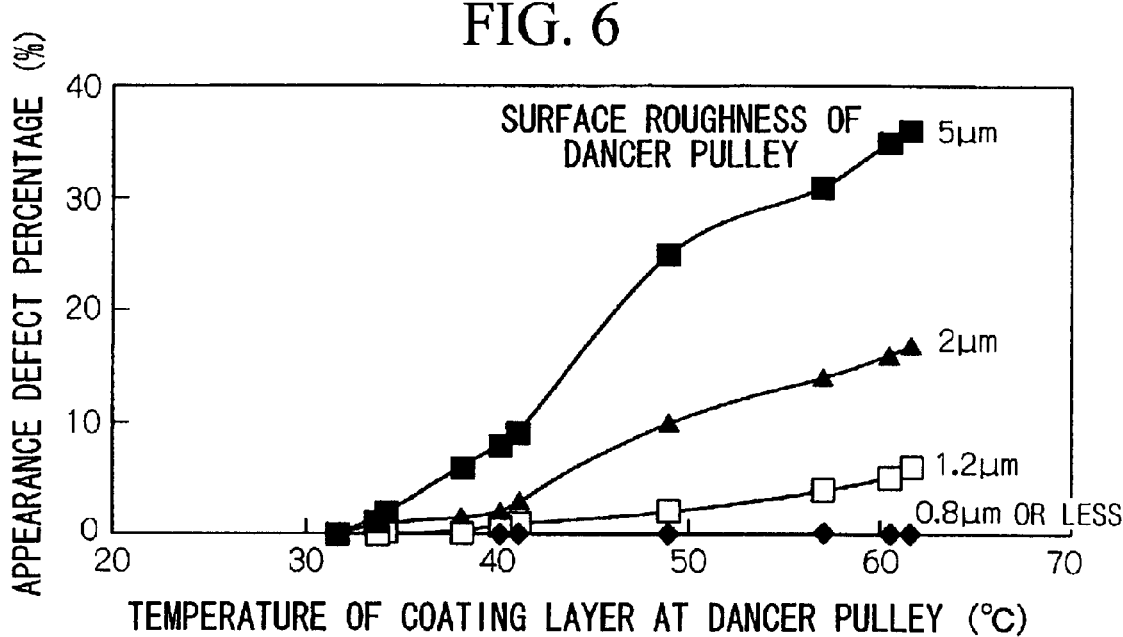
FIG. 6 is a graph showing the relationships between the temperature of the secondary coating layer measured at the dancer pulley and the appearance defect percentage of the coated optical fiber, which were defined when the surface roughness of the dancer pulley was changed.

FIG. 6 shows results relating to Comparative Example 3. As the drawing speed or the position of the UV lamp is changed, the temperature of the secondary coating layer at the dancer pulley 13a (here, the average between temperatures of the secondary coating layer measured at the entry and the exit of the dancer pulley) changes. Therefore, in FIG. 6, the horizontal axis shows this average temperature (°C.) of the secondary coating layer, the vertical axis shows the defect percentage relating to the appearance, and each curve corresponds to a different surface roughness (μm) of the dancer pulley 13b. Here, for simplicity, results relating to the surface roughness data of 3 μm, 1.5 μm, and 1 μm are not shown.

Similar to the above-explained results, when the surface roughness of the dancer pulley 13b is 0.8 μm or less, no defect appearance occurs for each drawing speed. However, in FIG. 6, the defect appearance starts to occur when the temperature of the secondary coating layer is between 30° C. to 40° C.

When the surface roughness of the capstan pulley 12a or the capstan belt lap 12b is changed, such dependence on the temperature of the secondary coating layer is not observed. This is because the temperature of the secondary coating layer at the capstan 12 is higher than that at the dancer pulley 13a, which causes no dependence on the temperature of the second coating layer.

Figure 7:
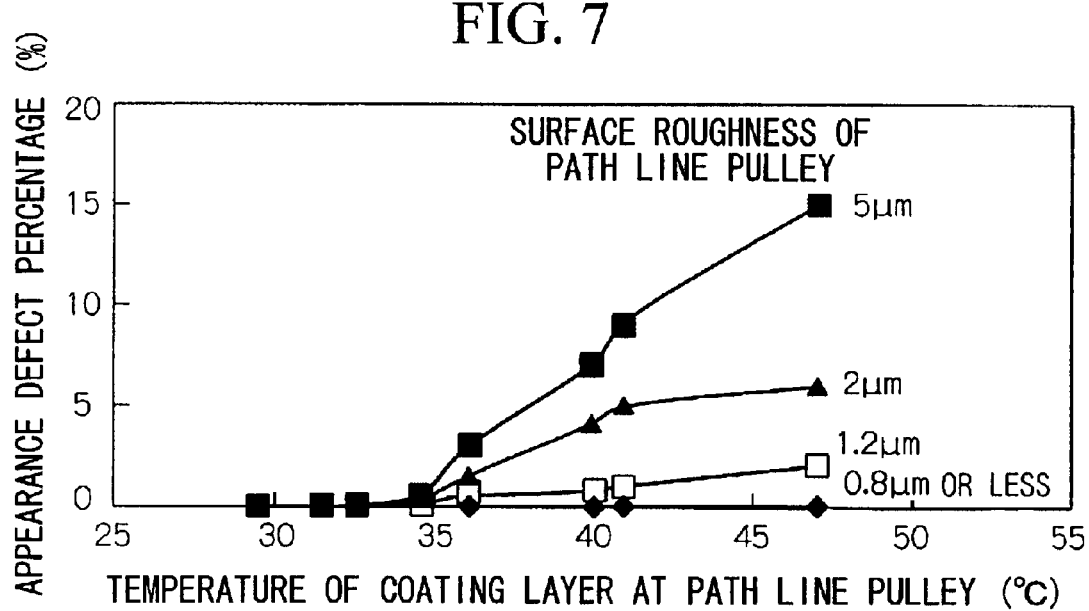
FIG. 7 is a graph showing the relationships between the temperature of the secondary coating layer measured at the path line pulley and the appearance defect percentage of the coated optical fiber, which were defined when the surface roughness of the path line pulley was changed.

FIG. 7 shows results relating to Comparative Example 3. In FIG. 7, the horizontal axis indicates the temperature of the secondary coating layer at the path line pulley 15 (the average between temperatures of the secondary coating layer measured at the entry and the exit of the path line pulley), the vertical axis shows the defect percentage relating to the appearance, and each curve corresponds to a different surface roughness (μm) of the path line pulley 15. Similar to FIG. 6, for simplicity, results relating to the surface roughness data of 3 μm, 1.5 μm, and 1 μm are not shown.

Similar to the above-explained results, when the surface roughness of the path line pulley 15 is 0.8 μm or less, no defect appearance is present for each drawing speed. However, in FIG. 7, the defect appearance starts to occur when the temperature of the secondary coating layer of the coated optical fiber exceeds approximately 35° C.

It is known that the Young's modulus depends on the temperature. When the temperature of the secondary coating layer increases, the Young's modulus decreases. Therefore, if the coating material (of the coated optical fiber) in a soft state contacts a solid body having an inferior surface condition, the smoothness of the surface of the coated optical fiber is lost. In other words, when the temperature of the secondary coating layer is in the vicinity of the ordinary temperature, the Young's modulus of the coating layer is high. In this case, even if the outer coating layer contacts a solid body having an inferior surface condition, the smoothness of the surface of the coated optical fiber is not lost.

Figure 8:
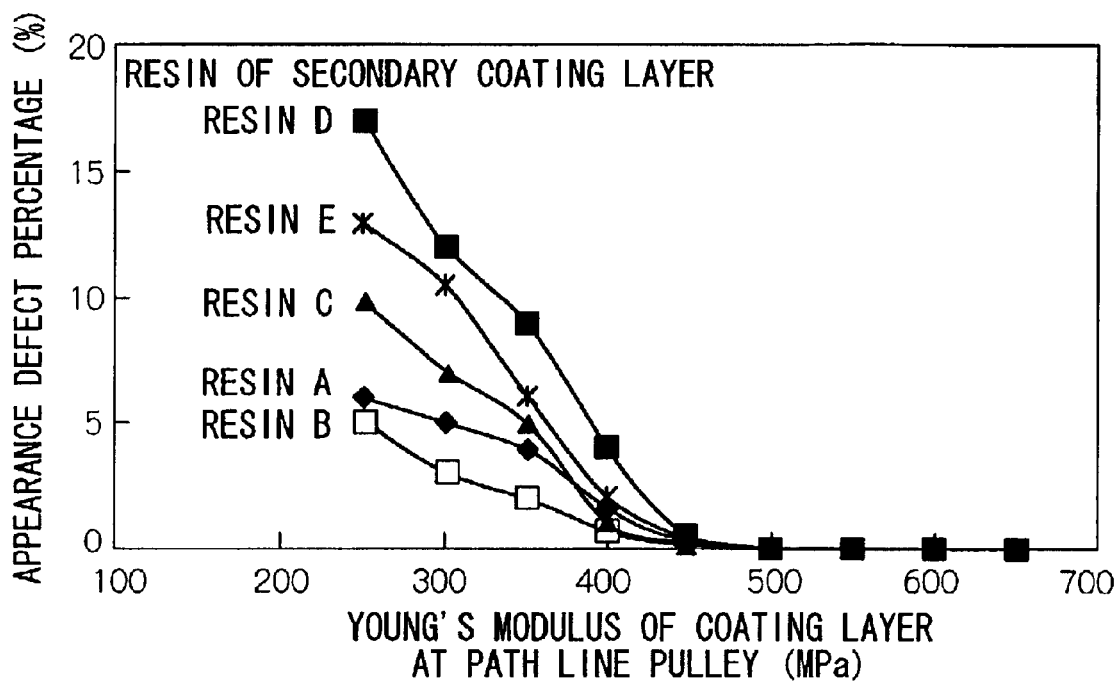
FIG. 8 is a graph showing the relationships between the Young's modulus of the secondary resin coating layer measured at the path line pulley and the appearance defect percentage of the coated optical fiber.

FIG. 8 shows results relating to Comparative Example 5. In FIG. 8, the horizontal axis indicates the Young's modulus (MPa) of the secondary coating layer at the path line pulley 15, the vertical axis indicates the defect percentage relating to the appearance, and each curve corresponds to a different kind of resin. In addition, the drawing speed is 1500 m/min, and the surface roughness of the relevant portion (which contacts the fiber) of the path line pulley 15 is 2 μm, which are common conditions for Comparative Example 5. As the secondary coating layer, four kinds of resin, that is, B, C, D, and E are additionally employed so as to manufacture and compare the corresponding coated optical fibers.

As a result, the appearance defect percentage starts increasing when the Young's modulus of the resin is approximately 500 MPa or lower. Therefore, it is obvious that when the Young's modulus of the secondary coating layer is higher than 500 MPa, the smoothness of the surface of the coated optical fiber is not damaged even if the coating layer contacts a solid body having an inferior surface.

Figure 9:
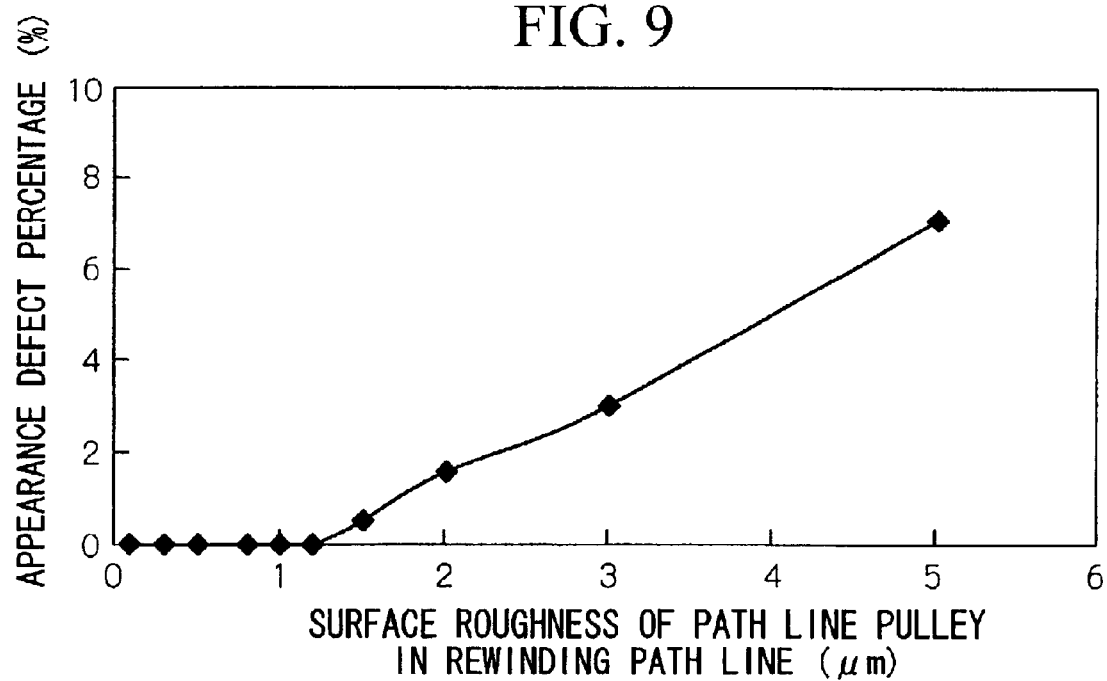
FIG. 9 is a graph showing the relationships between the surface roughness of the path line pulley in the rewinding path line and the appearance defect percentage of the coated optical fiber.

Below, results of Test 4 will be explained. FIG. 9 shows the results. In this test, the rewinding speed was 1800 m/min, and the surface roughness of the path line pulley 15 in the rewinding path line was changed. This test was performed at a room temperature (23° C). The secondary coating layer was made only of resin A.

As a result, the defect percentage of the appearance starts increasing when the surface roughness of the path line pulley 15 exceeds approximately 1.2 μm.

The Young's modulus of the secondary coating layer (made of resin A) at a room temperature of 23° C. is 750 MPa. As explained above, preferably, the surface roughness of each solid body which the coated optical fiber 10 contacts is always 0.8 μm or less. However, generally, solid bodies such as pulleys and belt laps which have superior surface conditions in the path line are expensive in comparison with those having inferior surface conditions. Therefore, a system in which all solid bodies have superior surface conditions increases the manufacturing cost.

Therefore, when the temperature of the secondary resin coating layer is a room temperature, or when the Young's modulus of the secondary coating layer is sufficiently higher than 500 MPa, the surface roughness of each solid body which the coated optical fiber 10 contacts may exceed 0.8 μm but should be 1.2 μm or less. The above ordinary temperature should be from 20 to 30° C.

The smoothness of the surface of the coated optical fiber manufactured as explained above can be investigated using a laser microscope. Below, results of the investigation will be explained. Here, the laser microscope, product number VK-8510, produced by KEYENCE Corporation, was used.

Figure 10:
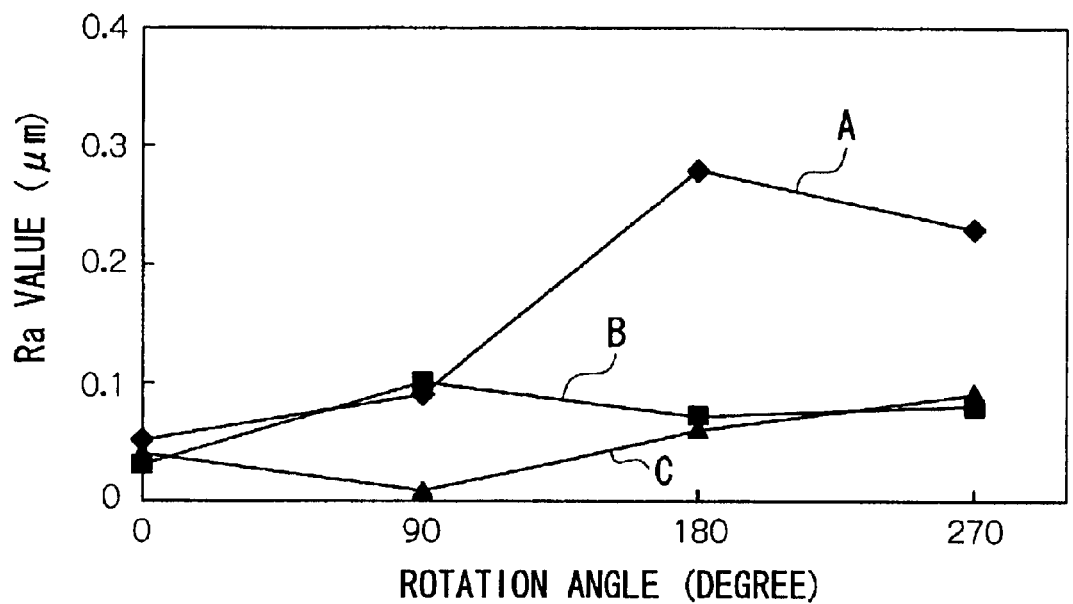
FIG. 10 is a graph showing the results of measurement of the surface roughness of the coated optical fiber, by using a laser microscope.

In the following explanation, "Ra value" indicates an average surface roughness value of the coated optical fiber, measured at each rotation angle, when the fiber is rotated by 90 degrees with respect to the axial direction. In FIG. 10, the vertical axis indicates the Ra value, and the horizontal axis indicates each rotation angle, and measurement results for non-defective and defective coated optical fibers are shown. In the graph, line A indicates results of the measurement for a defective coated optical fiber whose appearance has defects, line B indicates results of the first measurement for a non-defective coated optical fiber, and line C indicates results of the second measurement for a non-defective coated optical fiber. Here, the non-defective or defective condition was determined by the visual observation of the appearance.

The measurement pitch (for measuring the average surface roughness) was 0.1 μm, the gain of the laser beam was automatically controlled, and 4×optical zoom and simple 8×smoothing were employed in the measurement. No mechanism for performing brightness control such as a dark-cut or bright-cut process, was employed. Two measurement tests were performed for the non-defected coated optical fiber. In both cases, the Ra value is 0.1 μm or smaller. In contrast, the Ra value of the defective coated optical fiber was sometimes approximately 0.3 μm.

Figure 11:
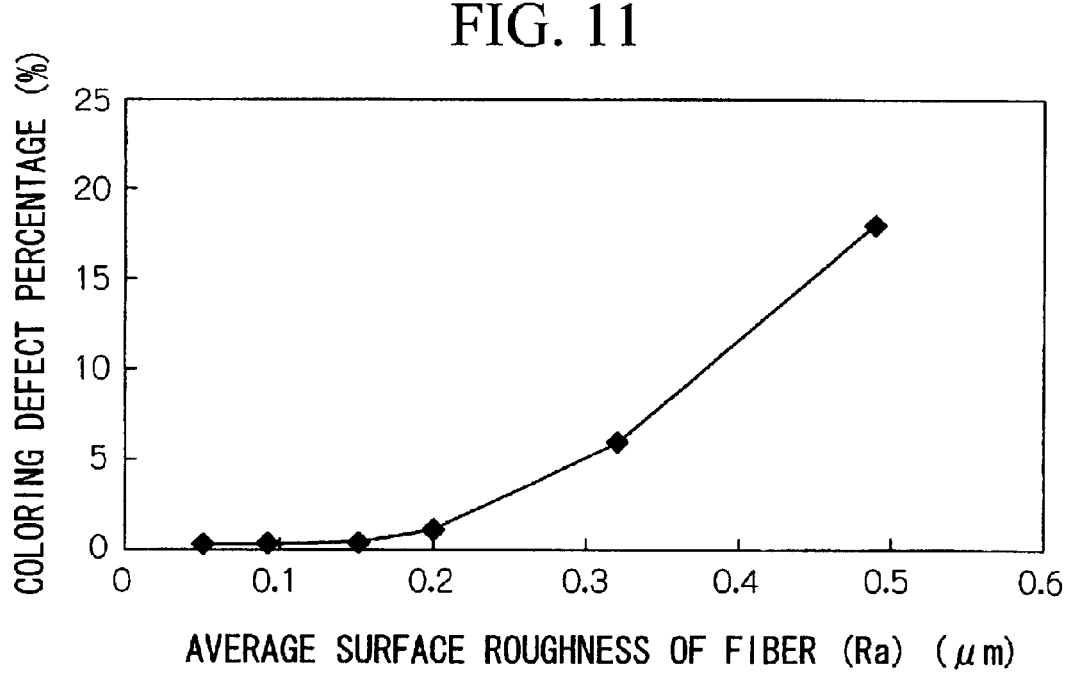
FIG. 11 is a graph showing the relationships between the surface roughness of the coated optical fiber and the defect percentage relating to the coloring of the coated optical fiber.

FIG. 11 shows results of investigation for determining how the defect percentage of the coloring changes depending on the Ra value which indicates the average surface roughness measured as explained above. In FIG. 11, the horizontal axis indicates the Ra value (μm) and the vertical axis indicates the defect percentage for coloring. In this investigation, 100 coated optical fibers, which have the same length of 10 km but have different average surface roughness values, were investigated.

As shown in FIG. 11, when the Ra value is 0.15 μm or smaller, the defect percentage of the coloring is almost 0%; however, when the Ra value exceeds 0.2 μm, this defect percentage sharply increases. Therefore, in order to reduce the defect percentage of coloring, it is preferable that the Ra value be 0.2 μm or smaller, and 0.15 μm or less is more preferable.

According to the above-explained method and apparatus for manufacturing the coated optical fiber, a bare optical fiber 3 is coated so as to make a coated optical fiber 10, and this coated optical fiber 10 is wound up by the take-up 14 via pulleys which are solid bodies. When the surface roughness of each solid body which the coated optical fiber 10 contacts is 0.8 μm or less, the smoothness of the outer coating layer of the coated optical fiber 10 is improved. Therefore, it is possible to manufacture a coated optical fiber 10 having superior surface smoothness and superior coloring performance using a colored ink.

In particular, when the temperature of the outer coating layer of the coated optical fiber is 35° C. or higher, or when the Young's modulus of the outer coating layer is 500 MPa or lower, the surface roughness of each solid body, which the coated optical fiber 10 contacts, is preferably 0.8 μm or less, thereby improving the smoothness and the coloring performance (using a colored ink) of the outer coating layer of the coated optical fiber 10.

When the temperature of the outer coating layer of the coated optical fiber 10 is a room temperature, or when the Young's modulus of the outer coating layer is higher than 500 MPa, the surface roughness of each solid body, which the coated optical fiber 10 contacts during drawing or rewinding, is preferably 1.2 μm or less, thereby improving the smoothness and the coloring performance (using a colored ink) of the outer coating layer of the coated optical fiber 10 while the manufacturing cost is reduced.

When the coated optical fiber has an average surface roughness of 0.2 μm or less, more preferably, 0.15 μm or less, the defect percentage relating to the coloring can be reduced.

What is claimed is:

1. A method of manufacturing a coated optical fiber, comprising the steps of:
    making a coated optical fiber by forming an outer coating layer around a bare optical fiber; and
    winding the coated optical fiber via pulleys by a take-up, wherein the surface roughness of each solid body which the outer layer of the running coated optical fiber contacts is 0.8 μm or less.

2. A method as claimed in claim 1, wherein when the temperature of the outer coating layer is 35° C. or higher, the surface roughness of each solid body which the outer layer of the coated optical fiber contacts is 0.8 μm or less.

3. A method as claimed in claim 1, wherein when the Young's modulus of the outer coating layer is 500 MPa or lower, the surface roughness of each solid body which the outer layer of the coated optical fiber contacts is 0.8 μm or less.

4. A method as claimed in claim 2, wherein when the Young's modulus of the outer coating layer is 500 MPa or lower, the surface roughness of each solid body which the outer layer of the coated optical fiber contacts is 0.8 μm or less.

5. A method of manufacturing a coated optical fiber, comprising the steps of:
    making a coated optical fiber by forming an outer coating layer around a bare optical fiber; and
    winding the coated optical fiber via pulleys by a take-up, wherein when at least one of the conditions that the temperature of the outer coating layer is a room temperature and the Young's modulus of the outer coating layer is higher than 500 MPa is satisfied, the surface roughness of each solid body, which the outer layer of the coated optical fiber contacts during drawing or rewinding, is 1.2 μm or less.

6. A coated optical fiber manufactured by a method as claimed in claim 1, wherein the coated optical fiber has an average surface roughness of 0.2 μm or less so as to reduce the defect percentage of coloring of the fiber.

7. A coated optical fiber manufactured by a method as claimed in claim 1, wherein the coated optical fiber has an average surface roughness of 0.15 μm or less so as to reduce the defect percentage of coloring of the fiber.

8. An apparatus for manufacturing a coated optical fiber, comprising:
    a drawing furnace for melting an optical fiber preform and forming a bare optical fiber;
    a cooling system for cooling the formed bare optical fiber;
    a resin coating system for coating the bare optical fiber with resin which functions as an outer coating layer of the coated optical fiber;
    a curing system for curing the resin; and
    pulleys arranged in a path line along which the coated optical fiber is transferred to a take-up,
    wherein the surface roughness of each solid body which the outer layer of the running coated optical fiber contacts is 0.8 μm or less.

9. An apparatus for manufacturing a coated optical fiber, comprising:
    a drawing furnace for melting an optical fiber preform and forming a bare optical fiber;
    a cooling system for cooling the formed bare optical fiber;
    a resin coating system for coating the bare optical fiber with resin which functions as an outer coating layer of the coated optical fiber;
    a curing system for curing the resin; and
    pulleys arranged in a path line along which the coated optical fiber is transferred to a take-up,
    wherein when at least one of the conditions that the temperature of the outer coating layer is a room temperature and the Young's modulus of the outer coating layer is higher than 500 MPa is satisfied, the surface roughness of each solid body which the outer layer of the coated optical fiber contacts is 1.2 μm or less.

10. A coated optical fiber manufactured by using an apparatus as claimed in claim 8, wherein the coated optical fiber has an average surface roughness of 0.2 μm or less so as to reduce the defect percentage of coloring of the fiber.

11. A coated optical fiber manufactured by using an apparatus as claimed in claim 8, wherein the coated optical fiber has an average surface roughness of 0.15 μm or less so as to reduce the defect percentage of coloring of the fiber.

12. A coated optical fiber manufactured by a method as claimed in claim 5, wherein the coated optical fiber has an average surface roughness of 0.2 μm or less so as to reduce the defect percentage of coloring of the fiber.

13. A coated optical fiber manufactured by a method as claimed in claim 5, wherein the coated optical fiber has an average surface roughness of 0.15 μm or less so as to reduce the defect percentage of coloring of the fiber.

14. A coated optical fiber manufactured by using an apparatus as claimed in claim 9, wherein the coated optical fiber has an average surface roughness of 0.2 μm or less so as to reduce the defect percentage of coloring of the fiber.

15. A coated optical fiber manufactured by using an apparatus as claimed in claim 9, wherein the coated optical fiber has an average surface roughness of 0.15 μm or less so as to reduce the defect percentage of coloring of the fiber.

* * * * *